United States Patent
Mantor et al.

(10) Patent No.: US 8,478,946 B2
(45) Date of Patent: Jul. 2, 2013

(54) METHOD AND SYSTEM FOR LOCAL DATA SHARING

(75) Inventors: Michael Mantor, Orlando, FL (US); Michael Mang, Oviedo, FL (US); Karl Mann, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 342 days.

(21) Appl. No.: 12/877,587

(22) Filed: Sep. 8, 2010

(65) Prior Publication Data
US 2011/0066813 A1    Mar. 17, 2011

Related U.S. Application Data

(60) Provisional application No. 61/240,475, filed on Sep. 8, 2009.

(51) Int. Cl.
*G06F 12/00* (2006.01)
(52) U.S. Cl.
USPC .......................................... 711/150; 711/200

(58) Field of Classification Search
USPC .................................................. 711/150, 200
See application file for complete search history.

(56) References Cited

U.S. PATENT DOCUMENTS

| | | | |
|---|---|---|---|
| 7,657,724 B1* | 2/2010 | DeHaemer | 711/202 |
| 7,805,589 B2* | 9/2010 | Du et al. | 711/220 |
| 2007/0156946 A1* | 7/2007 | Lakshmanamurthy et al. | 711/5 |
| 2008/0140994 A1* | 6/2008 | Khailany et al. | 712/205 |
| 2008/0320476 A1* | 12/2008 | Wingard et al. | 718/101 |

* cited by examiner

*Primary Examiner* — Hashem Farrokh
(74) *Attorney, Agent, or Firm* — Sterne, Kessler, Goldstein & Fox P.L.L.C.

(57) ABSTRACT

Embodiments for a local data share (LDS) unit are described herein. Embodiments include a co-operative set of threads to load data into shared memory so that the threads can have repeated memory access allowing higher memory bandwidth. In this way, data can be shared between related threads in a cooperative manner by providing a re-use of a locality of data from shared registers. Furthermore, embodiments of the invention allow a cooperative set of threads to fetch data in a partitioned manner so that it is only fetched once into a shared memory that can be repeatedly accessed via a separate low latency path.

18 Claims, 9 Drawing Sheets

Input Queue 108

| | 16 * [31:0] (512) | | | 16 * [31:0] (512) | |
|---|---|---|---|---|---|
| B0 | (Phase 0) | B15 | B16 | (Phase 1) | B31 |
| C16 | (Phase 1) | C31 | C0 | (Phase 0) | C15 |
| B32 | (Phase 2) | B47 | B48 | (Phase 3) | B63 |
| C48 | (Phase 3) | C63 | C32 | (Phase 2) | C47 |

0 ... 47

| | 16 * [13:0] (224) | | | 16 * [13:0] (224) | |
|---|---|---|---|---|---|
| A0 | (Phase 0) | A15 | A16 | (Phase 1) | A31 |
| A32 | (Phase 2) | A47 | A48 | (Phase 3) | A63 |

0 ... 23

[35:0]
| Cmd 0 |
0 ... 11

METHOD AND SYSTEM FOR LOCAL DATA SHARING

CROSS REFERENCE TO RELATED APPLICATIONS

This patent application claims the benefit of U.S. Provisional Patent Application No. 61/240,475, filed Sep. 8, 2009, entitled "Method and System for Local Data Sharing," which is incorporated herein by reference in its entirety.

BACKGROUND

1. Field of the Invention

The present invention relates generally to sharing of data in data processing units.

2. Background Art

Although some processors may have shared memory capabilities, they do not provide an architecture that allows the number of banks to be easily changed. Rather, the entire architecture of these existing products would need to be revised in order to change the number of memory banks. Additionally, these existing products do not have conflict resolution, full accessibility (addressability), or atomics.

What is needed is therefore is a flexible shared memory architecture that allows a designer to trade off performance versus cost without changing the architecture of the shared memory.

BRIEF SUMMARY OF EMBODIMENTS OF THE INVENTION

An embodiment includes a local data share (LDS) unit that allows a plurality of threads to share data. Embodiments include a co-operative set of threads to load data into shared memory so that they can have repeated memory access allowing higher memory bandwidth.

In this way, data can be shared between related threads in a cooperative manner to realize increased performance and a reduction of required power for some jobs. This particular technique of shared data will also enable a new class of potential algorithms that can be processed on the processor by providing a re-use of a locality of data from shared registers. Furthermore, embodiments of the present invention allow a cooperative set of threads to fetch data in a partitioned manner so that it is only fetched once into a shared memory. The shared memory can be repeatedly accessed via a separate low latency path.

Embodiments of the present invention can be used in any computer system, computing device, entertainment system, media system, game systems, communication device, personal digital assistant, or any system using one or more processors.

Embodiments of the present invention, for example, may be used processing systems having multi-core central processing units (CPUs), GPUs, and/or general purpose GPUs (GPGPUs), along with other types of processors because code developed for one type of processor may be deployed on another type of processor with little or no additional effort. For example, code developed for execution on a GPU, also known as GPU kernels, can be deployed to be executed on a CPU, using embodiments of the present invention.

BRIEF DESCRIPTION OF THE DRAWINGS

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF EMBODIMENTS OF THE INVENTION

An embodiment of the present invention includes a local data share (LDS) unit that allows a plurality of threads to share data. Embodiments include a co-operative set of threads to load data into shared memory so that they can have repeated memory access allowing higher memory bandwidth.

The LDS is configurable and can have any number of GPU or CPU threads being processed in parallel. By way of example, the present invention allows processing of a plurality of threads (e.g. 32 threads) in parallel. Included is a conflict state machine that analyzes memory addresses for each of the plurality of threads. The conflict state machine may then check the lower bits (or any other bit groups) of each of the plurality of addresses to determine which bank of memory each address maps to. The conflict state machine subsequently schedules access to one or more banks of memory. In this way, data can be shared between related threads in a cooperative manner to realize increased performance.

System

Figure 1A:
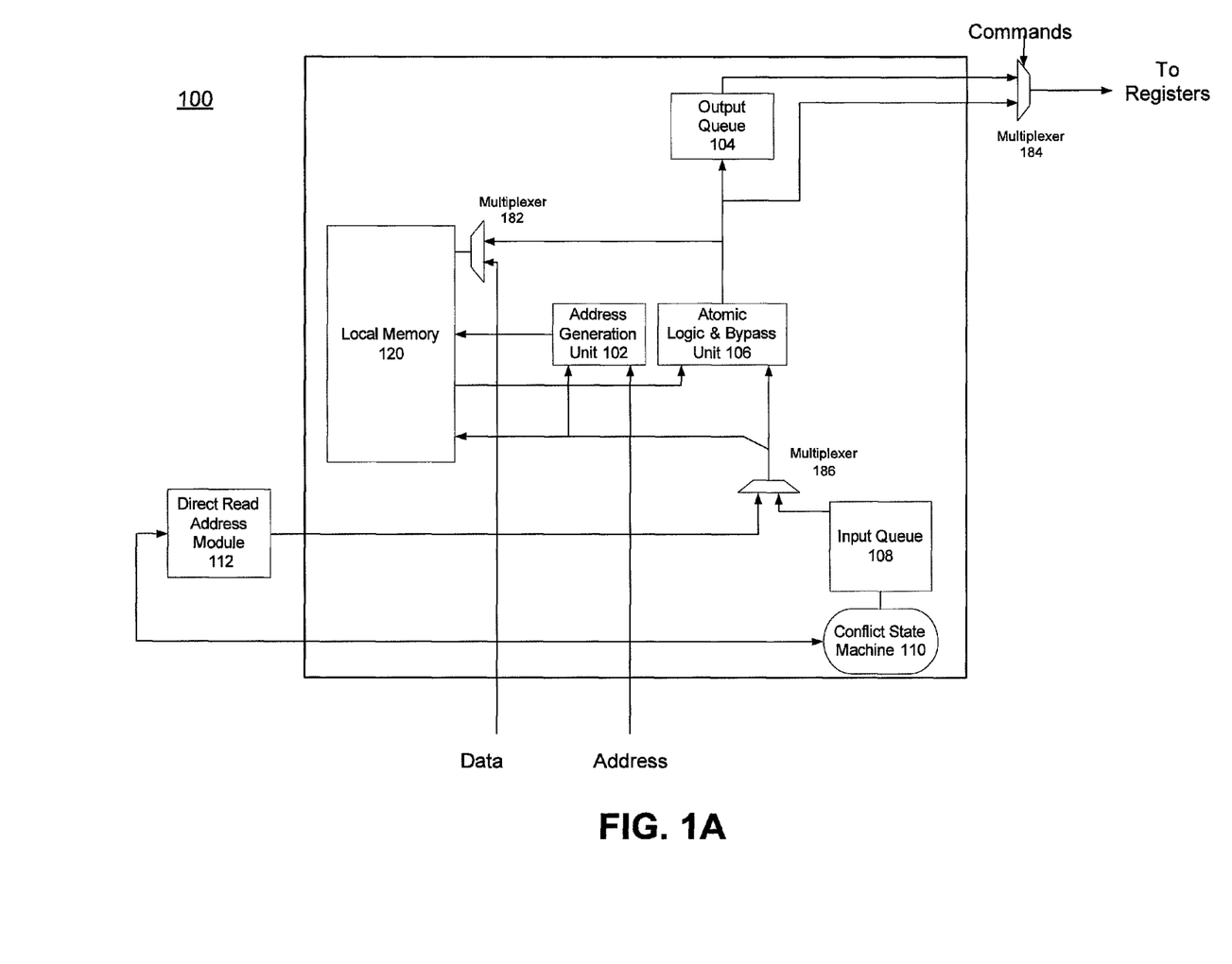
FIG. 1A is a block diagram illustration of an exemplary local data share (LDS) unit constructed in accordance with embodiments of present invention.

FIG. 1A is an illustration of an exemplary local data share unit (LDS) 100, according to an embodiment of the invention. As shown in FIG. 1A, LDS 100 includes address generation unit 102, output queue 104, atomic logic and bypass unit 106, input queue 108, output queue 104 and conflict state machine 110. LDS 100 also includes direct read address module 112, multiplexers 182-186 and local memory 120. (It is to be appreciated that the structure illustrated in FIG. 1A is for the purposes of illustration and not limitation.)

Local Memory 120

Figure 1B:
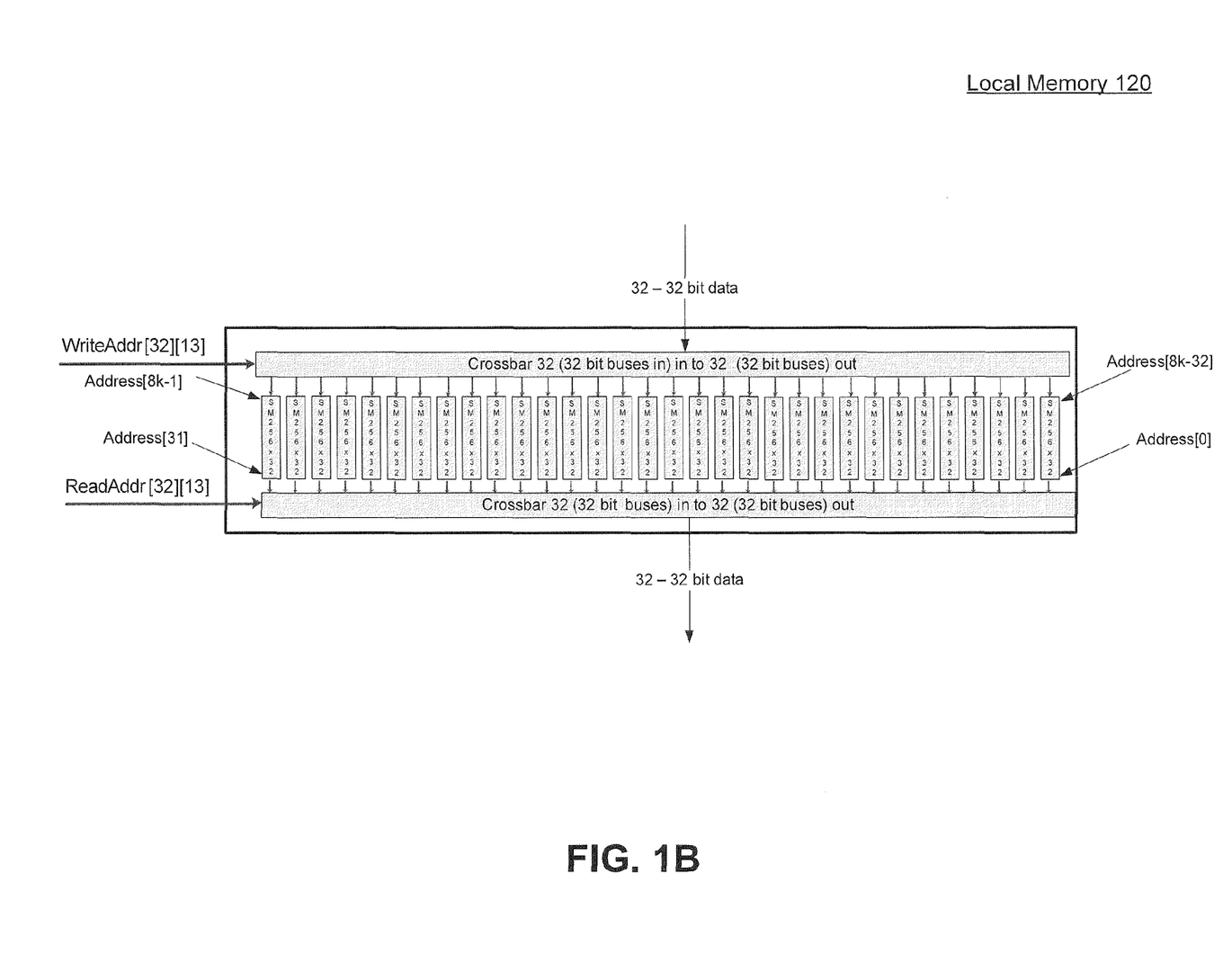
FIG. 1B is an illustration of an exemplary local memory.

In an embodiment, not intended to limit the invention, local memory 120 is 32 kilo-bytes in size and can be constructed from 32-256 deep×32 bits wide with one write and one read port. FIG. 1B is an illustration of an exemplary local memory 120, according to an embodiment of the invention. As illustrated in FIG. 1B, local memory 120 can have an interleaved bank address such that the lower 5 bits of a 'DWORD' address will be bank select bits and the upper 8 bits will be an address within the bank. The local memory 120 allows all banks to be read, written or both in one clock.

As an example, local memory 120 can enable up to 32 DWORD read and write ports accessible per clock when no bank conflicts exist. Since there will likely be latency associated with reading and writing, LDS 100 can prevent conflicts during the exposed latency of read/write. The basic structure of local memory 120 includes 32 banks that each pick up to one unique address to service. On a read only operation, multiple addresses that are the same can have read data broadcasted, but otherwise the same address may be serialized through atomic logic and bypass unit 106 by conflict state machine 110. The operation of atomic logic and bypass unit 106 is described in additional detail below.

Figure 1C:
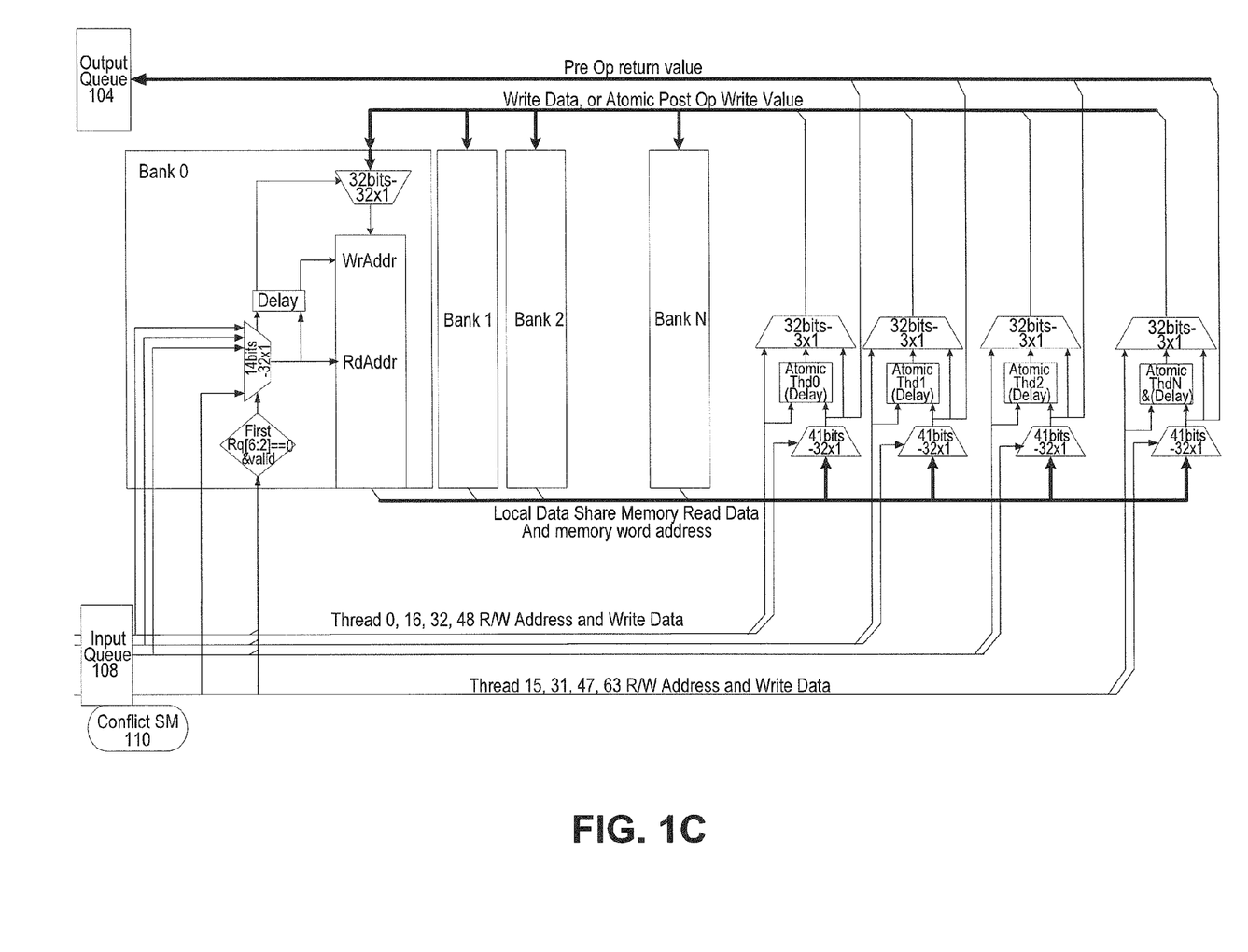
FIG. 1C is an exemplary basic data flow arrangement for a read, read/modify/write or write operations.

FIG. 1C illustrates an exemplary basic data flow arrangement for a read, read/modify/write or write operations. As shown in FIG. 1C, each bank of the local memory 120 can detect a first address that is valid for its bank and pipes the word address to read and/or write memory. Both the read data (if read enabled) and the address with a thread (pixel) selected will be forwarded to the atomic logic and bypass 106 for conflict and/or broadcast determination. Thus, if a read and the word address matches, it will get serviced. Furthermore, if a read and the word address did not match, it will not be serviced and conflict state machine 110 will be notified.

Figure 1D:
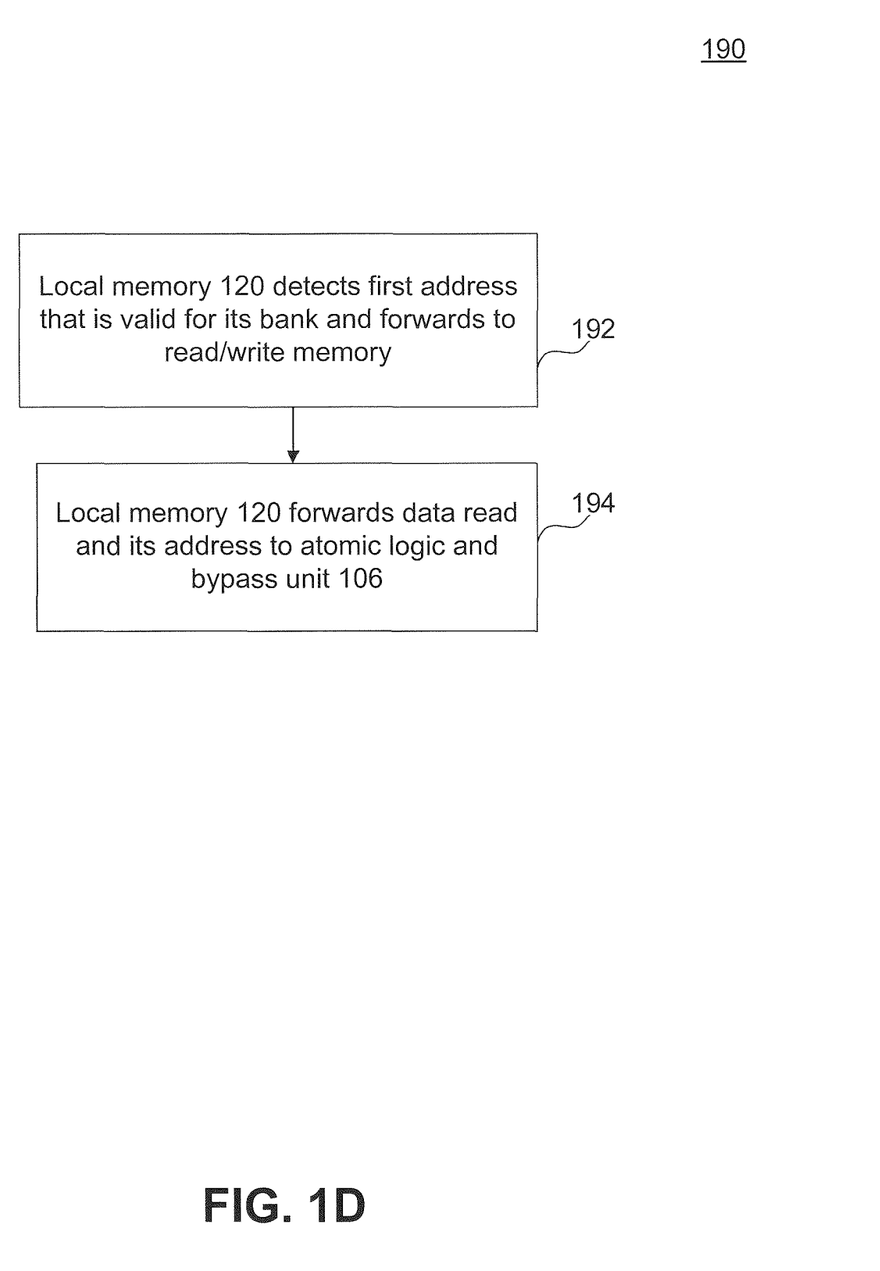
FIG. 1D is a flowchart of an exemplary method of operation of the local memory illustrated in FIG. 1B in accordance with embodiments of the present invention.

FIG. 1D is a flowchart of an exemplary method 190 illustrating operation of local memory 120, according to an embodiment of the invention. In step 192, local memory 120 detects a first address that is valid for its bank and forwards the word address to read and/or write memory. In step 194, local memory 120 forwards the data read and the address with a thread (pixel) to the atomic logic and bypass 106 for conflict and/or broadcast determination.

In an embodiment, memory space will need to be allocated per set of cooperative threads. A set of cooperative threads will be referenced as a thread group, and can include up to 1024 threads (per shader) and be machine independent. A subset of threads in a thread group will form a wavefront and that size will be dependent on the width of a single instruction-multiple data unit (SIMD). A thread block can include a partial wavefront, one wavefront, or multiple wavefronts.

In the present invention, the shared memory base address will be available to both instruction based addressing and shader math to enable desired addressing modes. Each and every thread of a thread group will have both read and write access to any location in the allocated space up to 32 kilobytes. Individual wavefronts or thread groups that do not require any shared memory can co-exist on a SIMD with thread blocks that use all the shared memory.

In an embodiment, not intended to limit the invention, write clients of LDS 100 include:
1. Store operations of ALU results
2. Input attribute data
3. Atomic read/write operations
4. Direct texture return data In an embodiment, not intended to limit the invention, read clients of LDS 100 include:
1. Direct reads for ALU Instructions
2. Index ALU load Operations
3. Atomic read/write operations Input Queue 108

In an embodiment, input queue 108 can store the data received in a manner so that a plurality of adjacent threads or pixels can do an operation together and such that bank conflicts can be minimized due to adjacency of address for cooperative threads. In an embodiment, input queue 108 provides enough storage to hide the latency of acquiring GPU or CPU data and the local data share look up for read data.

Figure 2A:
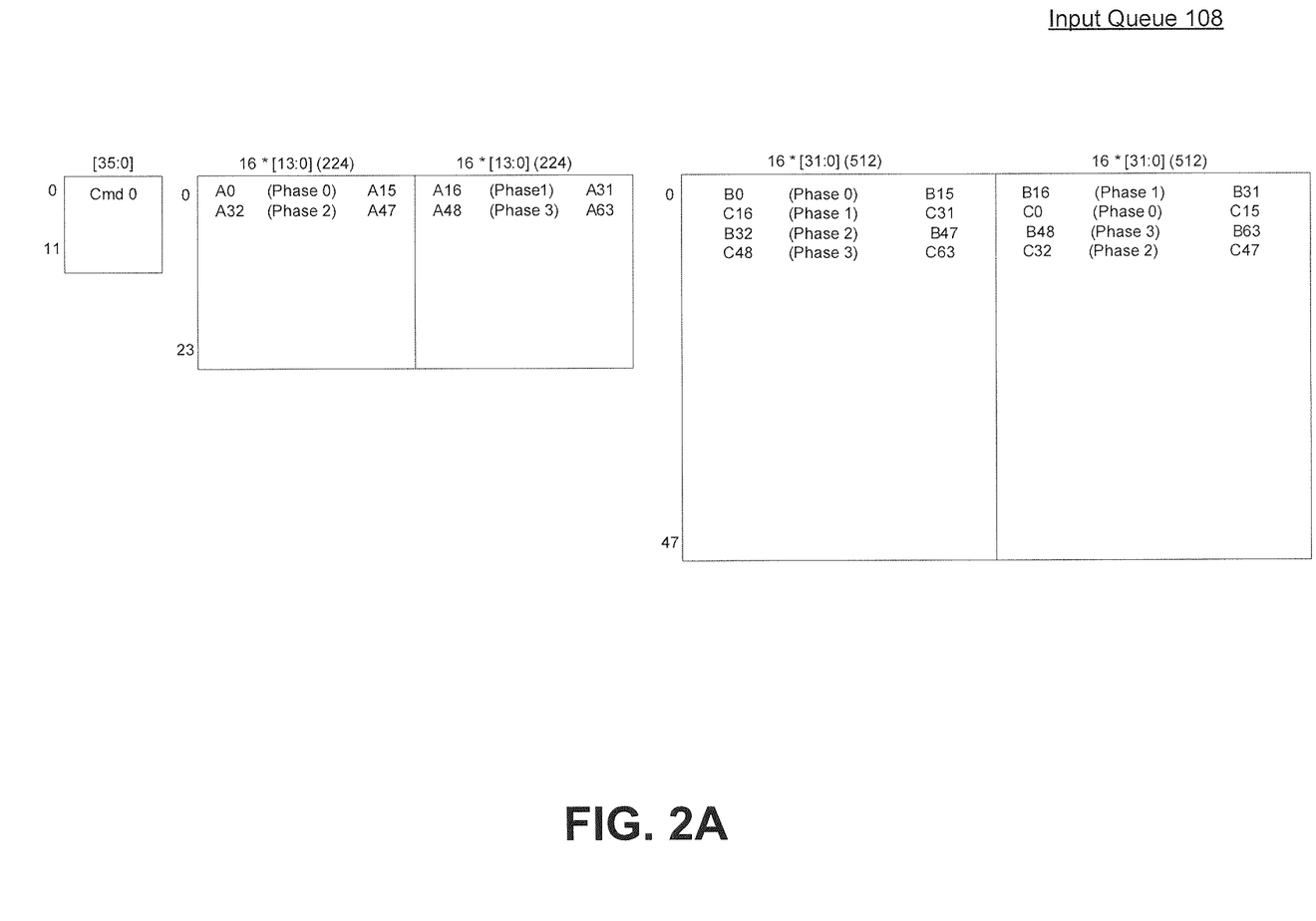
FIG. 2A is an illustration of an exemplary input queue constructed in accordance with embodiments of the present invention.

FIG. 2A illustrates an exemplary input queue 108, according to an embodiment of the invention.

As shown in FIG. 2A, one indexed request stored can be stored in input queue 108. The data is stored in a manner so that it can be accessed in one clock for cooperative operations. For example, each thread will have storage for one A, B, C operand. Each opcode specifies the use of A, B, C.

In an embodiment, input queue 108 is partitioned for 16 pixels to enable writing for each of 4 pixels independently. LDS 100 may process an index command once enough data has been received by input queue 108.

Output Queue 104

In an embodiment, output queue 104 will hold the results of an operation until the subsequent instruction reads the data corresponding to each indexed operation.

Figure 2B:
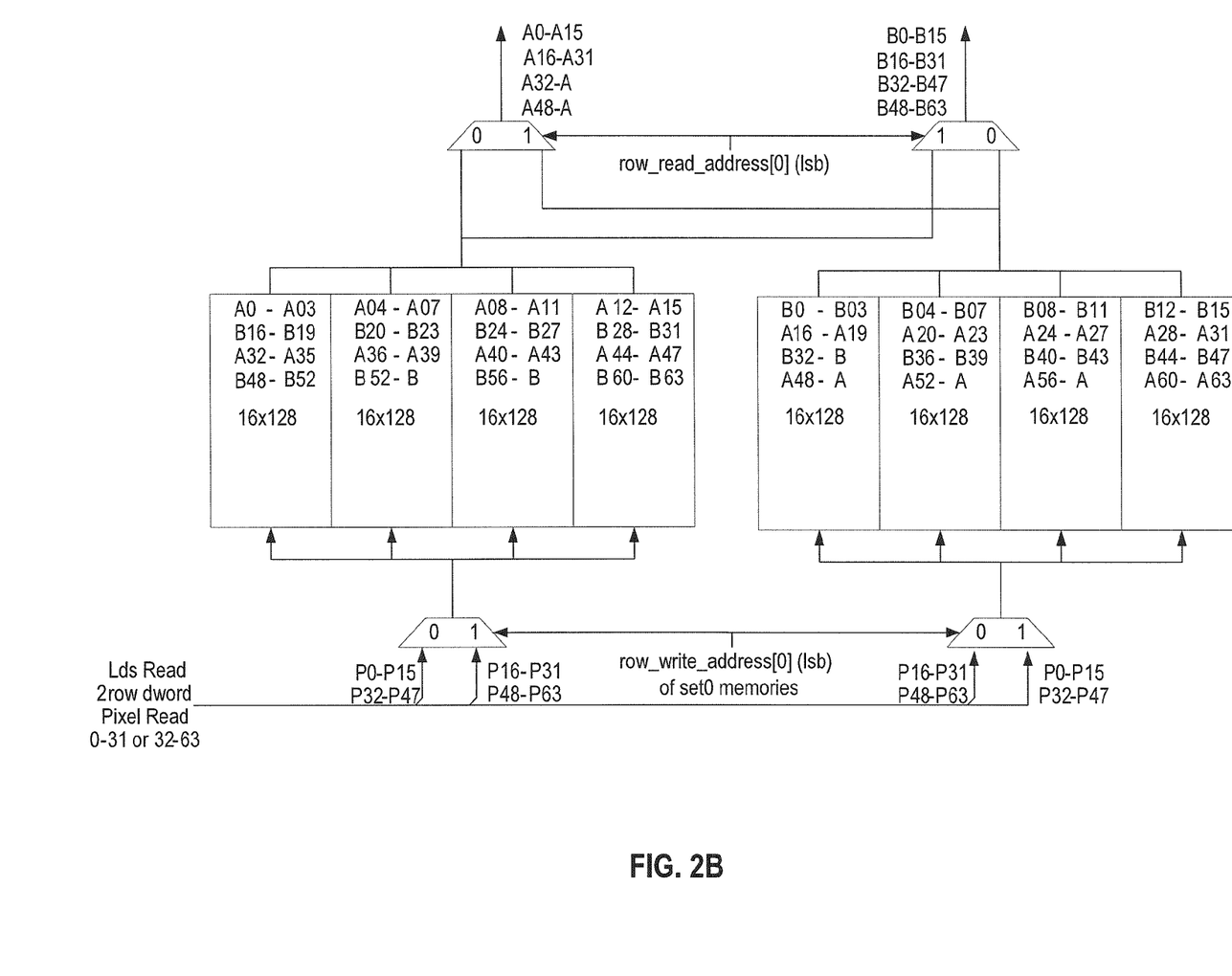
FIG. 2B is an illustration of an exemplary output queue constructed in accordance with embodiments of the present invention.

FIG. 2B illustrates an exemplary output queue 104, according to an embodiment of the invention. In an embodiment, output queue 104 will accept data read from local memory 120. For example, output queue 104 can accept 32 DWORDS per clock.

Atomic Logic and Bypass Unit 106

Figure 3A:
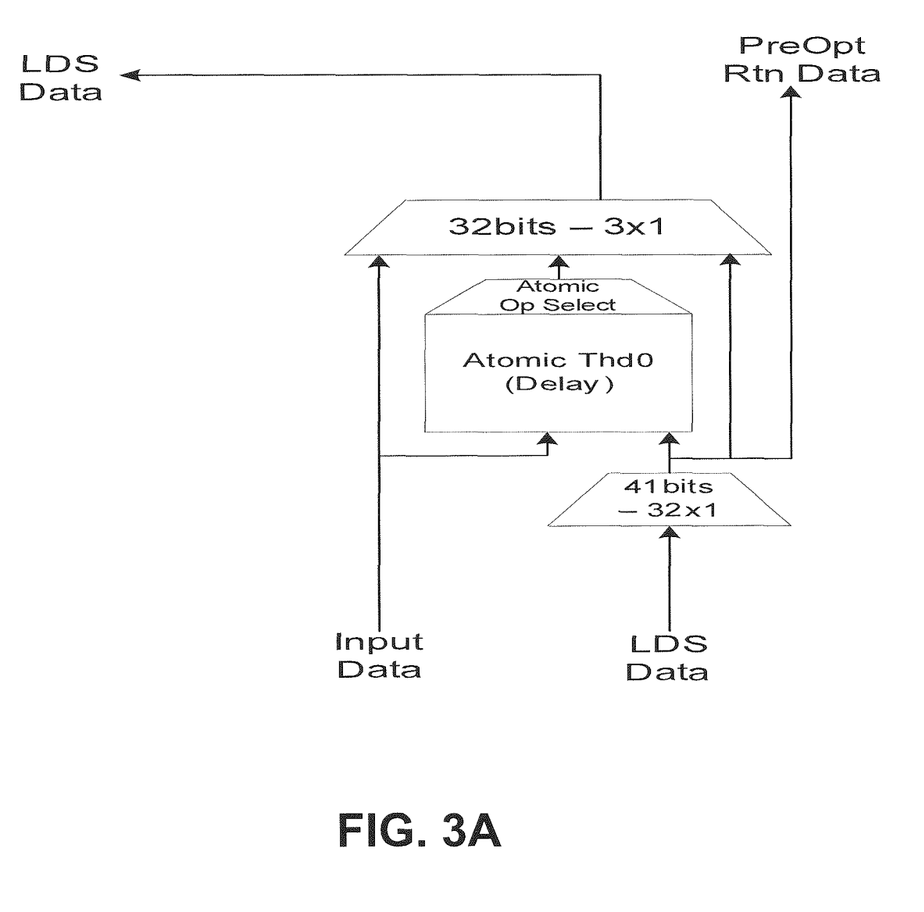
FIG. 3A is an illustration of an exemplary atomic logic and bypass unit constructed in accordance with embodiments of the present invention.

FIG. 3A illustrates a diagram of atomic logic and bypass unit 106 according to an embodiment of the invention. Atomic logic and bypass unit 106 provides a set of operations in a sequencer to LDS 100.

In an embodiment, atomic logic and bypass unit 106 includes a read modify write path. In an embodiment, there are a plurality (e.g. thirty-two) atomic modules per lane that can accomplish an atomic operation.

Atomic logic and bypass unit 106 reads a memory location from local memory 120 and takes data that came with the address to performs a compare and replace or an atomic add. An atomic add, for example, means that no other access to that memory address can happen during this atomic operation. Thus, atomic logic and bypass unit 106 takes the data at an address and modifies it and stores it back in at that address before any other processor can access to that same address.

As a purely illustrative example, if 32 lanes of data from local memory 120 were received and all of them have the same destination address then these operations would be completely serialized by atomic logic and bypass unit 106. Thus, atomic logic and bypass unit 106 would read the data from that address perform the first atomic operation, write it back, return the pre-op value and then get the second request or operation.

Figure 3B:
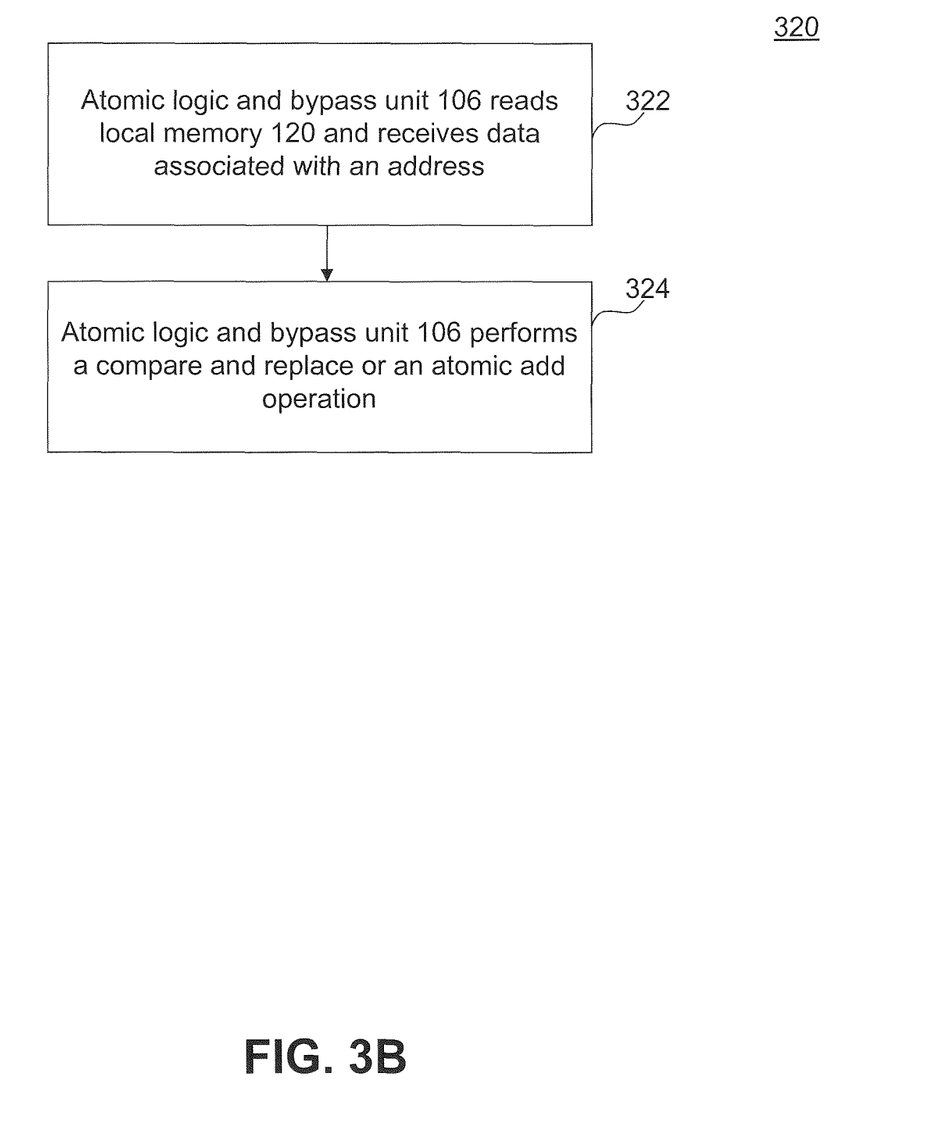
FIG. 3B is a flowchart of an exemplary method of operating the atomic logic and bypass unit illustrated in FIG. 3A.

FIG. 3B is flowchart 320 illustrating an exemplary operation of atomic logic and bypass unit 106, according to an embodiment of the invention. In step 322, atomic logic and bypass unit 106 reads a memory location from local memory 120 and receives data associated with the address. In step 324, atomic logic and bypass unit 106 performs a compare and replace operation or performs an atomic add operation.

One mode of operation of atomic logic and bypass unit 106 is 'direct read' in which it has the ability to read local memory 120 directly bypassing the input queue 108 and output queue 104. In this mode, the memory address is passed on to local memory 120 directly and the data is read bypassing output queue 104.

Another embodiment, called the 'interpolation read' mode, includes performing a read operation on the LDS 100's data arriving at multiplexer 182 and becomes the return data. If a write operation is being performed, LDS 100's data can be selected by multiplexer 182 and sent back to the LDS 100 location.

Address Generation Unit 102

As an illustrative example of the operation of address generation unit 102, consider that 32 addresses are received from 32 lanes on the input data. Part of this data includes command information and part of it is input data. The command portion can have an offset that is common to all the address indices. Thus, when 32 lanes of data are received and the command data part of the command data is a modifier to the address that came per lane, address generation unit 102 modifies the 32 addresses to offset addresses. In this way, when the addresses are sent to local memory 120 indexed operations can be performed without re-calculating base addresses. In another embodiment, a direct write from another processor is also allowed. In this mode, inputs from a shader processor (not shown) may be stalled and the shader processor provides an address from which the dependent address are determined from. This also allows LDS 100 to write multiple lanes of data into the local memory 120.

Direct Read Address Module 112

In an embodiment, the direct read address module may be used in the direct read mode and the interpolation mode described above. Direct read address module 112 receives a start address, a base address and a stride value. The direct read address module then uses the stride to find relative read addresses. In this way, a direct read mode would is a compressed request that has a base address, a stride and a number of bit-masks. In the direct read mode, for example, the request could include requests that are serviced in one clock so there are no means to provide any kind of stalling. However, it is to be appreciated that addresses can be requested with strides of data that may not generate any memory bank conflicts. In an embodiment, interpolation read mode logic is included in direct read address module 112. Direct read address module 112 derives addresses for different pixels of a wavefront for interpolation data. In this way, in accordance with the interpolation process and organization of shared memory, there are no bank conflicts or collisions during interpolation direct reads.

Figure 4:
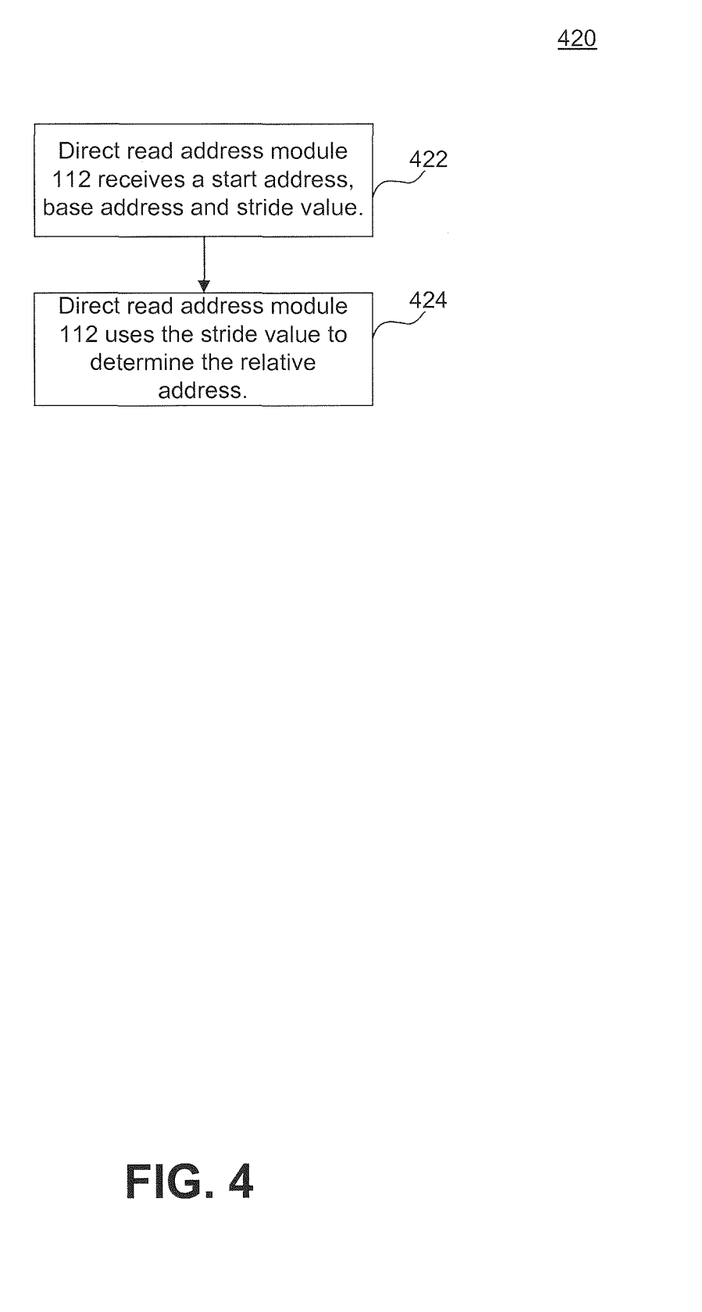
FIG. 4 is a flowchart of an exemplary method of operating a direct read address module in accordance with embodiments of the present invention.

FIG. 4 is a flowchart 420 illustrating an exemplary operation of direct read address module 112. In step 422, direct read address module 112 receives a start address, a base address and a stride value. In step 424, direct read address module 112, then uses the stride to find relative read addresses.

Conflict State Machine 110

As discussed above, embodiments of the invention include conflict state machine 110 to schedule work sent down to memory and atomic blocks based on memory accesses to avoid bank conflicts. In an embodiment, conflict state machine 110 analyzes memory addresses for each of the plurality of threads. Conflict state machine 110 may then check the lower bits (or any other bit groups) of each of the plurality of addresses to determine which bank of memory each address maps to. Conflict state machine 110 subsequently schedules access to one or more banks of memory. In this way, data can be shared between related threads in a cooperative manner to realize increased performance.

Configuring Coupled Processors/ALUs

In an embodiment, LDS 100 is configurable and can, for example, interface 64 processors or 32 processors. The shared memory width of LDS 100 is independent of the width of the pipe that is providing requests to LDS 100. Thus, by adjusting the width of the input and output units and the computational unit that is attached to it, input queue 108 can receive width of the computational unit. This width can differ from the width of the shared memory. As a purely illustrative example, if there are 64 processors interfaced with LDS 100 over 4 clocks 16 bits wide data, LDS 100 operates in a manner that takes 2 of the 16 bits wide data and couples them into one clock of operation against a local memory 120.

In this way, LDS 100 can be configured either by the width of the machine that is attached to LDS 100 or the width of the shared memory that is applied.

Various aspects of the present invention can be implemented by software, firmware, hardware (or hardware represented by software such as, for example, Verilog or hardware description language instructions), or a combination thereof. FIG. 1 is an illustration of an example computer system in which the present invention, or portions thereof, can be implemented as computer-readable code. It should be noted that the simulation, synthesis and/or manufacture of the various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer usable medium including a semiconductor, magnetic disk, optical disk (such as CDROM, DVD-ROM) and as a computer data signal embodied in a computer usable (e.g., readable) transmission medium (such as a carrier wave or any other medium such as, for example, digital, optical, or analog-based medium). As such, the code can be transmitted over communication networks including the Internet and internets. It is understood that the functions accomplished and/or structure provided by the systems and techniques described above can be represented in a core (such as a GPU/CPU core) that is embodied in program code and may be transformed to hardware as part of the production of integrated circuits.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A device, comprising:
an input queue coupled to a conflict state machine;
an output queue;
an address generation unit configured to generate a plurality of memory addresses; and
an atomic logic and bypass unit associated with the address generation unit configured to perform atomic operations;
wherein the conflict state machine resolves memory addressing conflicts based on the plurality of memory addresses.

2. The system of claim 1, further comprising:
a direct read address module configured to determine a relative address based on a stride value; and
a local memory portion of the local data share unit.

3. The system of claim 2, further comprising:
a multiplexer associated with the local memory and the atomic logic and bypass unit, the multiplexer configured to control data provided to the local memory.

4. A method comprising:
analyzing memory addresses for a plurality of threads;
checking one or more bits of the memory addresses to determine mapping to one or more memory banks;
scheduling access to the one or more memory banks; and
stalling input from a first processor to receive a first memory address of the memory addresses from a second processor.

5. The method of claim 4, wherein the determining comprises comparing lower order bits of the memory addresses.

6. The method of claim 4, wherein the analyzing comprises determining a memory address portion that is common to the memory addresses.

7. The method of claim 4, further comprising:
reading the one or more memory banks in a single cycle.

8. A non-transitory computer-readable storage device having computer-executable instructions stored thereon, execution of which, by a computing device, causes the computing device to perform operations comprising:
analyzing memory addresses for a plurality of threads;
checking one or more bits of the memory addresses to determine mapping to one or more memory banks;
scheduling access to the one or more memory banks; and
stalling input from a first processor to receive a first memory address of the memory addresses from a second processor.

9. The non-transitory computer-readable storage device of claim 8, wherein the determining comprises comparing lower order bits of the memory addresses.

10. The non-transitory computer-readable storage device of claim 8, wherein the analyzing comprises determining a memory address portion that is common to the memory addresses.

11. The non-transitory computer-readable storage device of claim 8, the operations further comprising:
reading the one or more memory banks in a single cycle.

12. The non-transitory computer-readable storage device of claim 8, wherein the operations are adapted to manufacture an apparatus configured to perform said analyzing, said checking and said scheduling.

13. A method comprising:
analyzing memory addresses of a plurality of threads;
checking respective bits of the memory addresses to determine mapping to one or more memory banks;
scheduling access to the memory banks;
modifying the memory addresses to generate offset addresses;
receiving a base address and a stride value; and
computing a relative read address using the base address and the stride value;
wherein the memory banks are accessed by bypassing an input queue and output queue.

14. The method of claim 13, further comprising:
reading data at a memory address; and
modifying the data at the memory address,
wherein only a single professor can access the memory address during the reading and modifying.

15. The method of claim 14, further comprising performing an atomic add or a compare and replace operation.

16. A computer-readable storage device having computer-executable instructions stored thereon, execution of which, by a computing device, causes the computing device to perform operations comprising:
analyzing memory addresses of a plurality of threads;
checking respective bits of the memory addresses to determine mapping to one or more memory banks; and
scheduling access to the memory banks;
modifying the memory addresses to offset addresses;
receiving a base address and a stride value; and
computing a relative read address using the base address and the stride value;
wherein the memory banks are accessed by bypassing an input queue and output queue.

17. The computer-readable storage device of claim 16, the operations further comprising:
reading data at a memory address; and
modifying the data at the memory address,
wherein only a single professor can access the memory address during the reading and modifying.

18. The computer-readable storage device of claim 17, further comprising performing an atomic add or a compare and replace operation.

* * * * *